United States Patent
Lenger et al.

(10) Patent No.: US 6,229,826 B1
(45) Date of Patent: May 8, 2001

(54) METHOD FOR SEARCHING SYNCHRONIZATION PATTERNS IN SERIAL, PACKET-ORIENTED AND MULTIPLEXED DATA STREAMS

(75) Inventors: Manfred Lenger, Vienna (AT); Gerhard Egler, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/016,373

(22) Filed: Jan. 30, 1998

(30) Foreign Application Priority Data

Jan. 31, 1997 (DE) .............................................. 197 03 613

(51) Int. Cl.[7] ....................................................... H04L 7/00
(52) U.S. Cl. ........................................... 370/510; 370/514
(58) Field of Search ................................... 370/509–514; 379/369, 366, 368

(56) References Cited

U.S. PATENT DOCUMENTS 4,847,877  7/1989 Besseyre .

5,742,647  * 4/1998 Chaisemartin ...................... 375/366

OTHER PUBLICATIONS

International Telecommunication Union—CCITT—Recommendation G.728—Coding of Speech At 16 kbit/s Using Low–Delay Code Excited Linear Prediction—Geneva 1992.

* cited by examiner

Primary Examiner—Melvin Marcelo
(74) Attorney, Agent, or Firm—Schiff Hardin & Waite

(57) ABSTRACT

For a method for searching synchronization patterns in serial, packet-oriented and multiplexed data streams, the m bits of a synchronization pattern are continuously inserted into each $n^{th}$ packet of a data stream. One bit of bits of the serial data stream that is acquired and comprises n packets is respectively stored in a memory cell of allocated memories that are m memory cells wide, said memory cell representing a bit position within n packets. The number of memories is determined by n×number of bits per packet. Upon recognition of a bit pattern in one of the memories, the bit position of the bit pattern in the serial data stream is defined.

10 Claims, 2 Drawing Sheets

METHOD FOR SEARCHING SYNCHRONIZATION PATTERNS IN SERIAL, PACKET-ORIENTED AND MULTIPLEXED DATA STREAMS

BACKGROUND OF THE INVENTION

According to ITU Standard G. 728, encoded voice signals are transmitted in packet-oriented fashion in PCM-oriented, multiplexed data streams. A packet thereby respectively comprises 10 bits (625 µs) or, respectively, one PCM data word (125 µs). For example, four data streams representing compressed encoded voice signals are multiplexed in PCM data words in a multiplexed, serial data stream. This means that 2 bits for the respective packet-oriented data stream are transmitted in each PCM data word according to G. 728, whereby a packet (10 bits) is formed of 5 sub-packets of 2 bits each.

Further, predetermined bit patterns, i.e. synchronization words are inserted into every data stream according to the ITU Recommendation G. 728. The bits of the bit pattern or of the synchronization words are continuously inserted into every $n^{th}$ packet of the data stream—for example into every $16^{th}$ packet or G. 728 data word. When a predetermined bit pattern or synchronization word is formed by m bits, for example 4 bits, then a predetermined bit pattern or synchronization word is transmitted after n×m×10 (packet length) bits of a packet-oriented data stream; given a word width of 4 bits and a repetition rate of 16 packets (of 10 bits each), a synchronization word is transmitted after 640 bits of the packet-oriented data stream.

In multiplexed data streams, at least one bit is allocated to a data stream in the respective packet. For example, four data streams encoded according to G. 728 are combined to form a multiplexed, PCM-oriented data stream. Respectively 2 bits (sub-packet) of a packet are thereby allocated to the respective PCM-oriented data stream. The individual bits of the synchronization word are thereby transmitted in the first bit, i.e. the "most significant bit".

SUMMARY OF THE INVENTION

An object of the invention is to find synchronization words in serial, packet-oriented and potentially multiplexed data streams in the shortest time.

According to a method of the present invention for searching a bit pattern formed by m predetermined bits in a serial, packet-oriented data stream where m≧1, bits of the bit pattern being continuously inserted into every $n^{th}$ packet of the data stream, where n≧1, one bit of bits of the serial data stream that are acquired and comprise n packets is stored in a memory cell of allocated memories that are m memory cells wide, the memory cell representing a bit position within n packets, whereby the number of memories is determined by n×number of bits per packet. The memories are checked for the presence of a bit pattern. Upon recognition of a bit pattern in one of the memories, the bit position of the bit pattern in the serial data stream is defined by this. Given multiplexed, packet-oriented data streams, an identical number of successive bits is allocated to each data stream in each multiplexed packet, whereby the bits of the bit patterns are inserted into every $n^{th}$ packet of the respective data stream. Upon recognition of a bit pattern in one of the memories allocated to a data stream, the bit position of the respective bit pattern in the multiplexed, serial data stream is defined by this.

According to an advantageous development of the method of the invention given x (x≧1) successive bits (sub-packet) of a packet of a data stream in a multiplexed packet, respectively one predetermined bit of the x bits is stored in an allocated memory that is m memory cells wide, whereby the respectively predetermined bit of x successive bits with in the multiplexed packets is copied into a memory cell of the memory that is m memory cells wide. This technique is particularly advantageous given synchronous words whose bits are respectively inserted at the beginning of a packet. Particularly given multiplexed bit streams, the bits that follow the first bit of a sub-packet of a data stream in the respective, multiplexed packet are no longer investigated, i.e. stored and evaluated.

According to a first version, bit patterns (SW) recognized in a memory after respectively n×m packets of the respective data stream are counted by a counter reading of a first counter unit allocated to the memory and are defined as a recognized bit pattern after a predetermined plurality of recognized bit patterns. A multiple locating of predetermined bit patterns or synchronization words in the data streams can be avoided with this technique.

According to a more advantageous, further version, a recognition of a bit pattern after respectively n×m packets of the respective data stream is counted by a corresponding allocated counter reading of a first counter unit. Given a non-recognition of the corresponding bit pattern, the corresponding counter reading of the first counter unit is reset, and the appertaining bit pattern or synchronization word is defined as recognized bit pattern or synchronization word when a predetermined number of a recognized bit patterns is reached. The dependability in view of the recognition of a predetermined bit pattern or synchronization word in a data stream is considerably enhanced by this technique. This is achieved in that the counter is reset, i.e. set back to an initial value, even given a one-time non-recognition of a bit pattern. When a predetermined number of recognized bit patterns occur in the respective data stream, then the predetermined number is to be increased. The dependability of recognizing a predetermined bit pattern or synchronization word is enhanced further by the increase of the predetermined number.

The method of the invention is explained in greater detail below on the basis of two block circuit diagrams and a flowchart.

DESCRIPTION OF THE PREFERRED EMBODIMENTS

Figure 1:
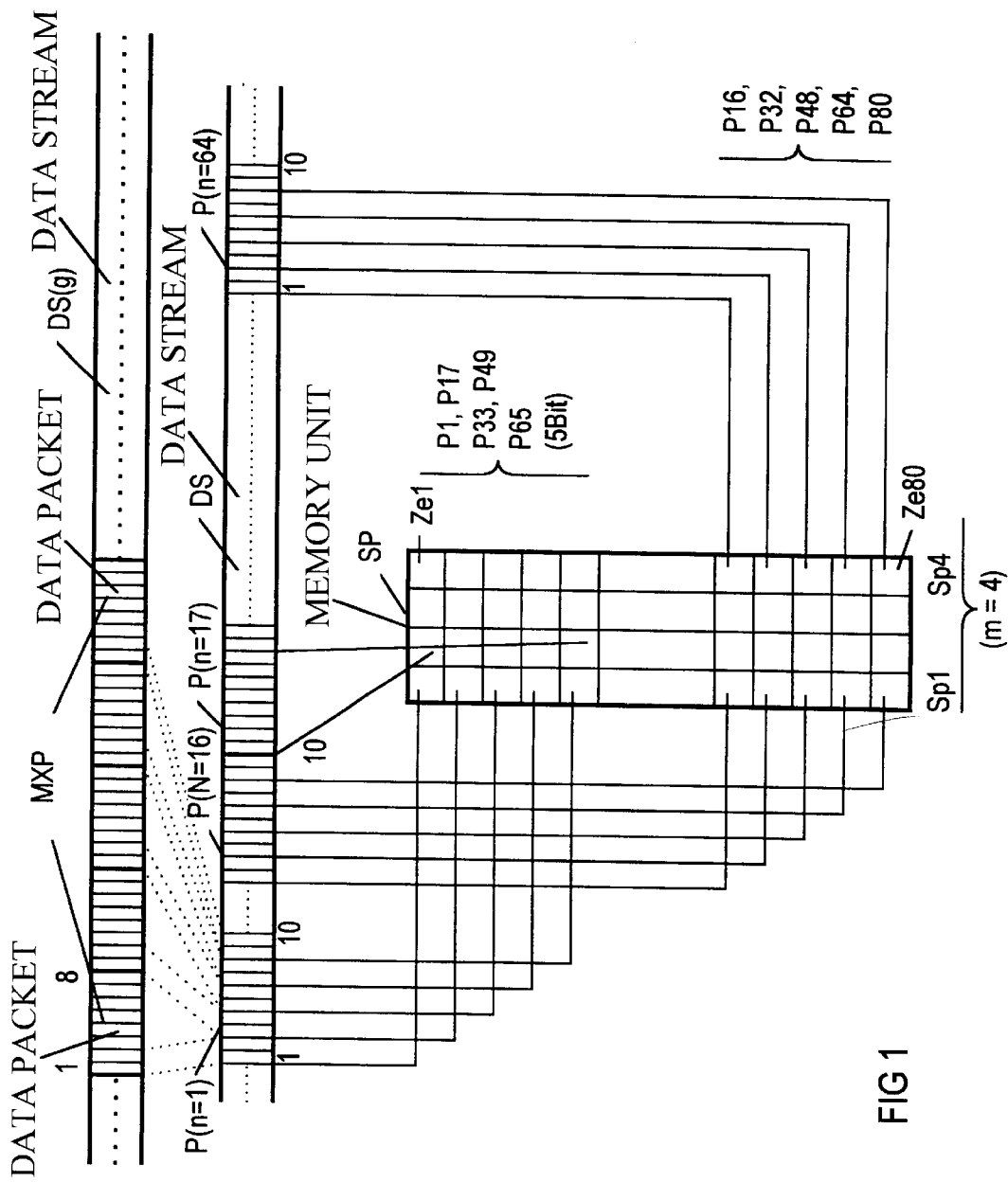
FIG. 1 is a block circuit diagram of a serial, multiplexed data stream as well as a memory unit of the invention.

FIG. 1 partially shows a multiplexed, PCM-oriented data stream DS(g) that is formed by serially joined, multiplexed packets MXP or data packets MXP. By way of example, five multiplexed packets MXP are shown in FIG. 1. Let it be assumed for the exemplary embodiment that a multiplexed data packet MXP comprises eight bits and that four data streams DS are multiplexed in each data packet MXP, whereby respectively two successive bits—forming a sub-packet—in a multiplexed data packet MXP are allocated to each data stream DS. The data streams DS are respectively formed by data packets P that respectively comprise ten bits.

One of the four data streams DS is shown by way of example. In the exemplary embodiment, the data streams DS represent digitized voice information having a respective transmission rate of 16 kbit/s that are compressed according to the ITU Standard G. 728, whereby the compressed, digitized voice information are embedded in data packets P comprising 10 bits.

The data packets P of the data streams DS contain synchronization words or synchronization bit patterns with the assistance of which the start of a packet P is identified after a transmission over a transmission link. A decompression of the voice information compressed according to ITU Standard G. 728 can be subsequently implemented. Since the start of a packet P is to be determined by the synchronization words SW, the individual bits of the synchronization words SW are respectively inserted at the start of a packet P. Further, the bits of a synchronization word SW are not inserted in every data packet P but in every $n^{th}$ data packet P. It is assumed in the exemplary embodiment that a bit of synchronization word SW is embedded in every $16^{th}$ data packet P. Given a synchronization word SW covering four bits, this means that a complete synchronization word SW is communicated after 640 bits of a data stream DS, or after 2560 bits of a multiplexed data stream DS (g).

Since the individual bits of the synchronization words respectively appear at the start of a data packet and the first and second, the third and fourth, the fifth and sixth, the seventh and eighth as well as the ninth and tenth bits of a packet in a data stream DS to be communicated are respective multiplexed into the two allocated bits of the multiplexed data packet MXP, only the respectively first of the two bits of the multiplexed data packet MXP is utilized for locating the synchronization word SW. This means that, instead of the 10 bits of a data packet P of a data stream DS, only 5 bits have to be examined for locating the synchronization word SW. Accordingly (see FIG. 1), the first, third, fifth, seventh and ninth bits of the incoming data stream DS are copied into a first memory cell of a first, second, third, fourth and fifth memory, or of a row Ze1 . . . 5 of a memory unit SP, whereby the first memory cells respectively form a first column Sp1 of the memory unit SP. Analogous thereto, each first one of the two bits of a multiplexed data packet MXP is copied into the first memory cell or column Sp1 of the following $6^{th}$ through $80^{th}$ memories or rows Ze6 . . . 80 for each following packet P. In FIG. 1, a data stream DS with a memory unit SP is shown by way of example. Beginning with the second memory cell or column Sp2 of the first memory or of the first row Ze1, this procedure is implemented until the bits of a data stream DS incoming at the beginning thereof are copied into the eighty memories or rows Ze1 . . . 80 of the four columns Sp1 . . . 5 of the memory unit SP. As a result of this type of copying of the bits of a data stream DS, each first, third, fifth, seventh and ninth bit is entered into a respective row 1 . . . 80 in the spacing of 16 packets.

When the individual bits of the synchronization word reside, for example, at an arbitrary location, then a memory or a row Ze need not be potentially provided for each second bit, but a memory or row Ze is provided for each incoming bit of the respective data stream DS. When a memory or a row Ze in the memory unit SP is provided for each incoming bit, then the required number of memories or rows Ze in the memory unit SP is determined by n×the number of bits per packet P. The required number of memories or rows Ze is cut in half, i.e. 80 rows Ze1 . . . 80, in an advantageous storing of every second bit of a synchronization word according to the exemplary embodiment. This results due to the multiplexing of respectively 2 bits. A further reduction of memories or rows Ze is achieved given a multiplexing of, for example, 3 or 4 bits per data stream DS, whereby the bits of the synchronization word SW are inserted at the beginning or at a defined bit position of a packet P.

The rows Ze1 . . . 80 comprising m memory cells (m=4) are investigated for the presence of a synchronization word SW, i.e. the four stored bits of a row 1 . . . 80 are compared to the four bits comprising a synchronization word SW. A synchronization word SW can thereby also be defined by an arbitrary bit combination. Let it be assumed for the exemplary embodiment that the synchronization word appears in the seventh row Ze7. This means that the beginning of a data packet P with which the beginning of a synchronization word SW is also determined is determined with the third bit in the second data packet P. The identified beginning of a or of further data packets P, or the beginning of the synchronization word SW is utilized as a starting basis for the decompression and sampling of the respective data stream DS.

Figure 2:
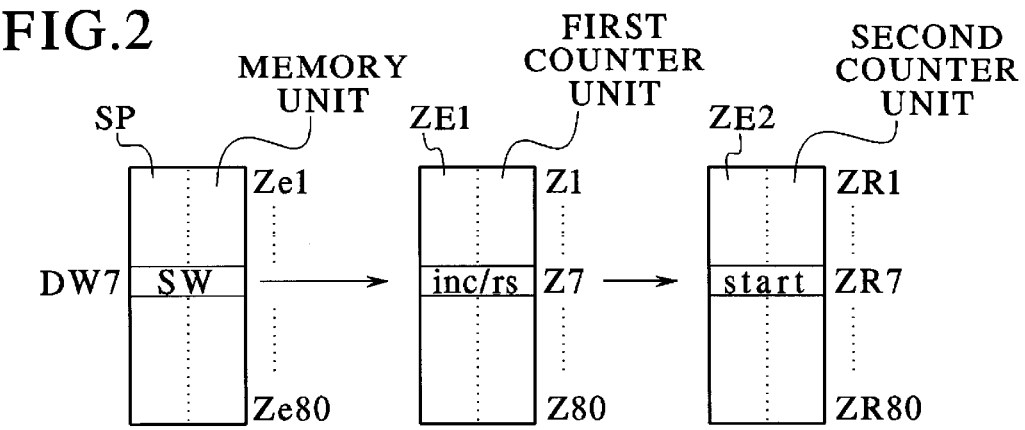
FIG. 2 is a block circuit diagram of the memory unit of the invention and counter structure.

Since an arbitrary, multiple appearance of synchronization words SW can occur in the communicated data streams DS, the multiple, continuous appearance of synchronization words SW is determined with the assistance of two following counter unit ZE1, 2, whereby a first and a second counter unit ZE1, 2—indicated with the designation ZE1 and ZE2 for all eighty rows Ze1 . . . 80 in FIG. 2—is allocated to each memory or each row Ze1 . . . 80 of the memory unit SP. The appearance of a synchronization word SW in one of the eighty rows Ze1 . . . 80 is thereby identified in the respectively allocated, first counter unit ZE1 by incrementation of the current counter reading Z1 . . . 80. A counting routine ZR1 . . . 80 is started in the second counter unit ZE2 by the determination of a synchronization word SW. Since a synchronization word SW appears in the seventh row Ze7 in the exemplary embodiment, the seventh counter reading Z7 of the first counter unit ZE1 is incremented, i.e. is increased by the value 1 given an initial counter reading of zero. The seventh counting routine ZR7 is started as a result thereof.

Figure 3:
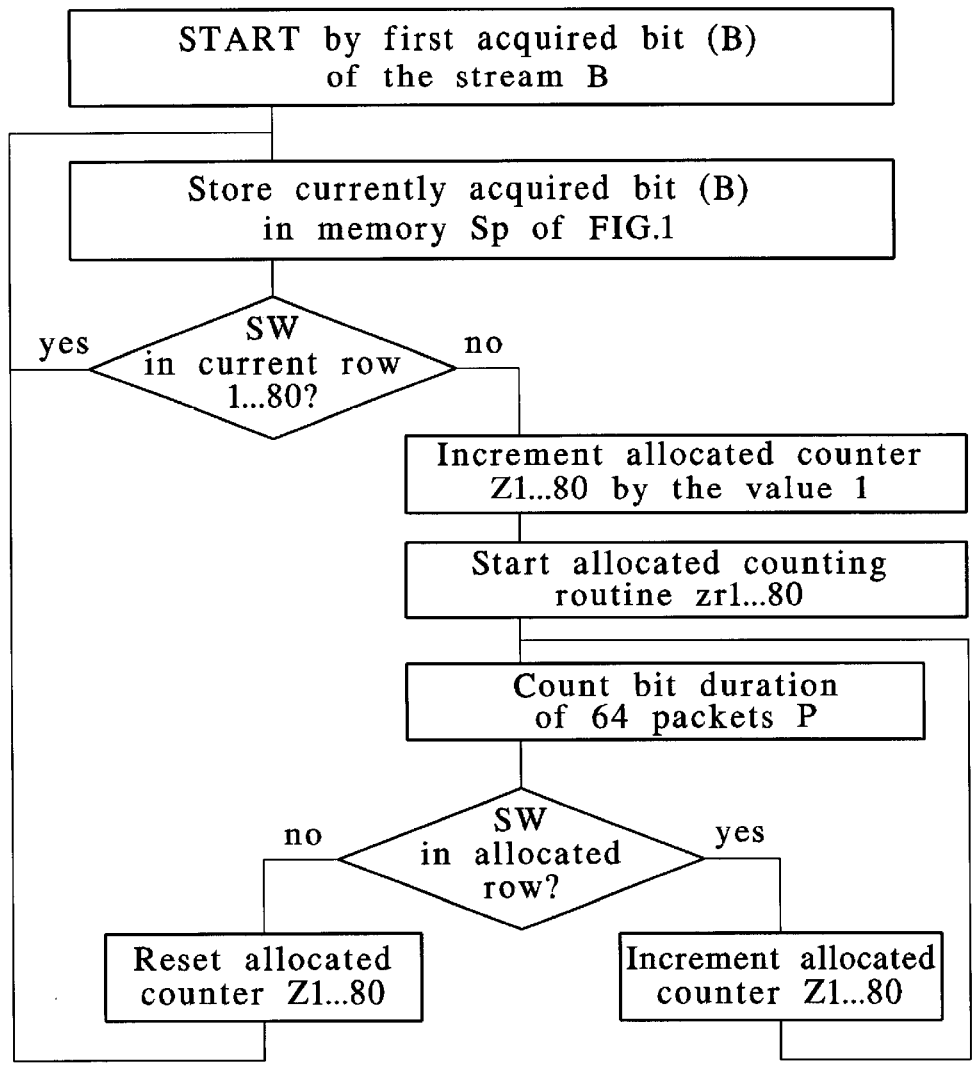
FIG. 3 is a flowchart of the method of the invention according to the embodiment in FIG. 1 and FIG. 2.

The function of the counting routines ZR1 . . . 80, i.e. of the seventh counting routine ZR7 as well, is presented on the basis of a flowchart in FIG. 3. A check as to whether the synchronization word SW appears in the corresponding row Ze1 . . . 80—row Ze7 in the exemplary embodiment—is carried out by this counting routine ZR1 . . . 80 after respectively 64 packets P. When a synchronization word SW appears, the corresponding counter reading Z7 of the first counter unit ZE1 is incremented. When no synchronization word SW appears in the corresponding row Ze1 . . . 80, the corresponding counter reading Z1 . . . 80 of the first counter unit ZE1 is reset to an initial value, usually the value zero. When the highest counter reading Z1 . . . 80 of the first counter means ZE1 is higher than the second highest counter reading Z1 . . . 80 by a predetermined value—for example, two—, then the bit of a data packet P representing the beginning of a packet P or of a synchronization word SW is defined by the row Ze1 . . . 80 allocated to the highest counter reading.

A synchronization word SW in data streams DS(g) that are structured according to G. 728 and multiplexed can be found in the shortest search time with the assistance of the method of the invention, whereby, for checking the further occurrence of the located synchronization word SW, only the corresponding counter reading of the first counter unit ZE1 is processed and the corresponding counting routine ZR1 . . . 80 of the second counter unit ZE2 is active. The remaining memories or rows Ze of the memory unit SP and the further counter readings Z or counting routines ZR of the first and second counter unit ZE1,2 are no longer required. These are only reactivated, i.e. the incoming data packets P are stored and checked according to FIG. 1, after a determination of lacking synchronization words SW.

Although various minor changes and modifications might be proposed by those skilled in the art, it will be understood that our wish is to include within the claims of the patent warranted hereon all such changes and modifications as reasonably come within our contribution to the art.

We claim as our invention:

1. A method for searching a bit pattern formed by m predetermined bits in a serial, packet-oriented data stream where ($m \geq 1$), and wherein bits of the bit pattern are continuously inserted into every $n^{th}$ packet of the data stream where ($n \geq 1$), comprising the steps of:

storing one bit of bits of the serial data stream that are acquired and which comprise n packets in a memory cell of allocated memories that are m memory cells wide, said memory cell representing a bit position within n packets, a number of the allocated memories being determined by nxa number of bits per packet;

checking the memories that are m memory cells wide for presence of the bit pattern; and upon recognition of the bit pattern in one of the memories, defining a bit position of the bit pattern in the serial data stream.

2. The method according to claim 1, including the steps of:

given multiplexed, packet-oriented data streams, allocating an identical number of successive bits to each data stream in each multiplexed packet, bits of the bit patterns being inserted into every $n^{th}$ packet of the respective data stream; and upon recognition of a bit pattern in one of the memories allocated to a data stream, defining the bit position of the respective bit pattern in the multiplexed, serial data stream.

3. The method according to claim 2 wherein given x successive bits of a packet of a data stream in a multiplexed packet with $x \geq 1$ respectively storing one predetermined bit of the x bits in an allocated memory that is m memory cells wide, the respectively predetermined bit of x successive bits within the multiplexed packets being copied into a memory cell of the memory that is m memory cells wide.

4. The method according to claim 1, including the steps of:

counting a bit pattern recognized in a memory after respectively nxm packets of the respective data stream by a counter reading of a first counter unit allocated to the memory; and defining the recognized bit pattern after a predetermined number of recognized bit patterns.

5. The method according to claim 1, including the steps of:

counting a recognition of a bit pattern after respectively nxm packets of the respective data stream by a corresponding, allocated counter reading of a first counter unit;

given a non-recognition of a corresponding bit pattern resetting the corresponding counter reading of the first counter unit; and defining the corresponding bit pattern as the recognized bit pattern when a predetermined number of recognized bit patterns is reached.

6. The method according to claim 4 wherein if two or more recognized bit patterns in the respective data stream occur, increasing the predetermined number.

7. The method according to claim 5 wherein if two or more recognized bit patterns in the respective data stream occur, increasing the predetermined number.

8. The method according to claim 1 wherein the bit patterns are represented by synchronization patterns or synchronization words that are arbitrarily prescribable and variable during operation.

9. The method according to claim 1 wherein the packet-oriented data stream is structured according to ITU Standard G. 728, wherein a packet comprising ten bits is represented as an encoded voice signal.

10. The method according to claim 1 wherein a multiplexed data stream is formed by PCM-oriented, multiplexed packets; at least one bit of a data stream structured according to ITU Standard G. 728 is allocated in every multiplexed packet comprising eight bits, and wherein a number of successive, allocated bits is determined by a transmission rate of the multiplexed data stream and of the respective data stream.

* * * * *